(12) United States Patent
Yoshiyama et al.

(10) Patent No.: US 8,718,395 B2
(45) Date of Patent: May 6, 2014

(54) IMAGE PROCESSING APPARATUS, DISPLAY APPARATUS PROVIDED WITH SAME, AND IMAGE PROCESSING METHOD

(75) Inventors: Kazuyoshi Yoshiyama, Osaka (JP); Hiroyuki Furukawa, Osaka (JP); Naoko Kondoh, Osaka (JP); Shinji Nakagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 27 days.

(21) Appl. No.: 13/576,699

(22) PCT Filed: Feb. 22, 2011

(86) PCT No.: PCT/JP2011/053829
§ 371 (c)(1),
(2), (4) Date: Aug. 2, 2012

(87) PCT Pub. No.: WO2011/105365
PCT Pub. Date: Sep. 1, 2011

(65) Prior Publication Data
US 2012/0301047 A1    Nov. 29, 2012

(30) Foreign Application Priority Data
Feb. 26, 2010   (JP) ................... 2010-042997

(51) Int. Cl.
  *G06K 9/40*   (2006.01)
(52) U.S. Cl.
  USPC .......................................... 382/263
(58) Field of Classification Search
  None
  See application file for complete search history.

(56) References Cited

U.S. PATENT DOCUMENTS 5,182,520 A * 1/1993 Urata ............................ 327/363
5,513,016 A * 4/1996 Inoue ............................ 358/3.26
(Continued)

FOREIGN PATENT DOCUMENTS

JP    07-240859 A    9/1995
JP    09-247501 A    9/1997
(Continued)

OTHER PUBLICATIONS

Official Communication issued in International Patent Application No. PCT/JP2011/053829, mailed on May 24, 2011.

*Primary Examiner* — Bhavesh Mehta
*Assistant Examiner* — Feng Niu
(74) *Attorney, Agent, or Firm* — Keating & Bennett, LLP

(57) ABSTRACT

Provided is an image processing apparatus that obtains an effect of improving perceived definition even when an input image signal does not include much of a high range component. The image processing apparatus (10) includes a high-pass filter (1) that extracts a mid-high range component from the input image signal; a nonlinear processing unit (2) that performs nonlinear processing on an output signal from the high-pass filter (1); an addition unit (3); a threshold value determination unit (4) that determines an upper threshold value and lower threshold value for clipping processing based on the maximum value and minimum value of the pixel values in the input image signal in the range thereof that was subjected to processing by the high-pass filter (1); a clipping unit (5) that performs clipping processing using the upper threshold value and lower threshold value; a high-pass filter (6) for an output signal from the clipping unit (5); a non-linear processing unit (7) that performs non-linear processing on an output signal from the high-pass filter (6); and an addition unit (8) that adds an output signal from the non-linear processing unit (7) and the output signal from the clipping unit (5).

7 Claims, 15 Drawing Sheets

(56) References Cited

U.S. PATENT DOCUMENTS

| | | | |
|---|---|---|---|
| 5,880,767 A * | 3/1999 | Liu | 347/251 |
| 7,352,896 B2 * | 4/2008 | Rantanen et al. | 382/167 |
| 2006/0001775 A1 | 1/2006 | Miyazawa | |
| 2007/0136050 A1 * | 6/2007 | Tourwe | 704/205 |
| 2008/0285882 A1 * | 11/2008 | Lin | 382/266 |
| 2010/0134518 A1 * | 6/2010 | Moriya et al. | 345/660 |

FOREIGN PATENT DOCUMENTS

| | | |
|---|---|---|
| JP | 2004-266775 A | 9/2004 |
| JP | 2005-033698 A | 2/2005 |
| JP | 2006-019951 A | 1/2006 |

* cited by examiner

IMAGE PROCESSING APPARATUS, DISPLAY APPARATUS PROVIDED WITH SAME, AND IMAGE PROCESSING METHOD

TECHNICAL FIELD

The present invention relates to an image processing apparatus and an image processing method for performing processing for improving perceived definition by emphasizing the high-frequency component of an input image signal, for example, and a display apparatus that includes the image processing apparatus.

1. Background Art

Recent years have seen advancements in the increase in the resolution of displays, and particularly with liquid crystal displays, plasma displays, and the like that are used as television receivers, the increase in the resolution of television broadcast signals is accompanied by demand for achieving a high level of perceived definition and perceived resolution. For this reason, a known method of improving perceived definition involves emphasizing contours and emphasizing the high-frequency component in display images.

For example, JP 2004-266775A discloses an image display apparatus including a high-pass filter that extracts the high range component (contour signal) from an input image signal, a non-linear characteristic circuit that provides the contour signal with a non-linear characteristic, and an adder that adds the output from the non-linear characteristic circuit to the original image signal. According to this conventional image display apparatus, an image signal in which the high range component has been emphasized by the non-linear characteristic circuit can be obtained.

2. Disclosure of Invention

However, with conventional image display apparatuses such as that described above, there are cases where, depending on the input image signal, the perceived definition is not improved. For example, assume the case of an input image signal such as that shown in FIG. 15A. This input image signal is a low-resolution signal, and if the image signal does not include a high range component that will be subjected to emphasis processing (a component having a frequency higher than the frequency fa) as shown in FIG. 15B, the output signal will not be influenced by high range component emphasis processing as shown in FIG. 15C.

An object of the present invention is to provide an image processing apparatus and an image processing method that obtain an effect of improving perceived definition even in the case where an input image signal does not include much of a high range component, and a display apparatus that includes the image processing apparatus.

In order to achieve the above object, an image processing apparatus disclosed here includes: a first high-pass filter that extracts a mid-high range component having frequencies greater than or equal to a first frequency value from an input image signal; a first non-linear processing unit that performs non-linear processing on an output signal from the first high-pass filter; a first addition unit that adds an output signal from the first non-linear processing unit and the input image signal; a threshold value determination unit that detects a maximum value and a minimum value of pixel values of the input image signal in a range thereof that was subjected to processing in the first high-pass filter processing, and determines an upper threshold value and a lower threshold value for clipping processing based on the maximum value and the minimum value; a clipping unit that performs clipping processing on an output signal from the first addition unit using the upper threshold value and the lower threshold value; a second high-pass filter that extracts a high range component having frequencies greater than or equal to a second frequency value that is greater than the first frequency value from an output signal from the clipping unit; a second non-linear processing unit that performs non-linear processing on an output signal from the second high-pass filter; and a second addition unit that adds an output signal from the second non-linear processing unit and the output signal from the clipping unit.

Also, a display apparatus disclosed here includes the aforementioned image processing apparatus and a display unit that performs display based on an output signal from the image processing apparatus.

Furthermore, an image processing method disclosed here includes: a first extraction step of extracting a mid-high range component having frequencies greater than or equal to a first frequency value from an input image signal; a first non-linear step on an output signal obtained in the first extraction step; a first addition step of adding an output signal obtained in the first non-linear step and the input image signal; a threshold value determination step of detecting a maximum value and a minimum value of pixel values of the input image signal in a range that was subjected to processing in the first extraction step, and determining an upper threshold value and a lower threshold value for clipping processing based on the maximum value and the minimum value; a clipping step on an output signal obtained in the first addition step, using the upper threshold value and the lower threshold value; a second extraction step of extracting a high range component having frequencies greater than or equal to a second frequency value that is greater than the first frequency value from an output signal obtained in the clipping step; a second non-linear step on an output signal obtained in the second extraction step; and a second addition step of adding an output signal obtained in the second non-linear step and the output signal obtained in the clipping step.

The present invention enables providing an image processing apparatus and an image processing method that obtain an effect of improving perceived definition even in the case where an input image signal does not include much of a high range component, and a display apparatus that includes the image processing apparatus.

DESCRIPTION OF THE INVENTION

Figure 1:
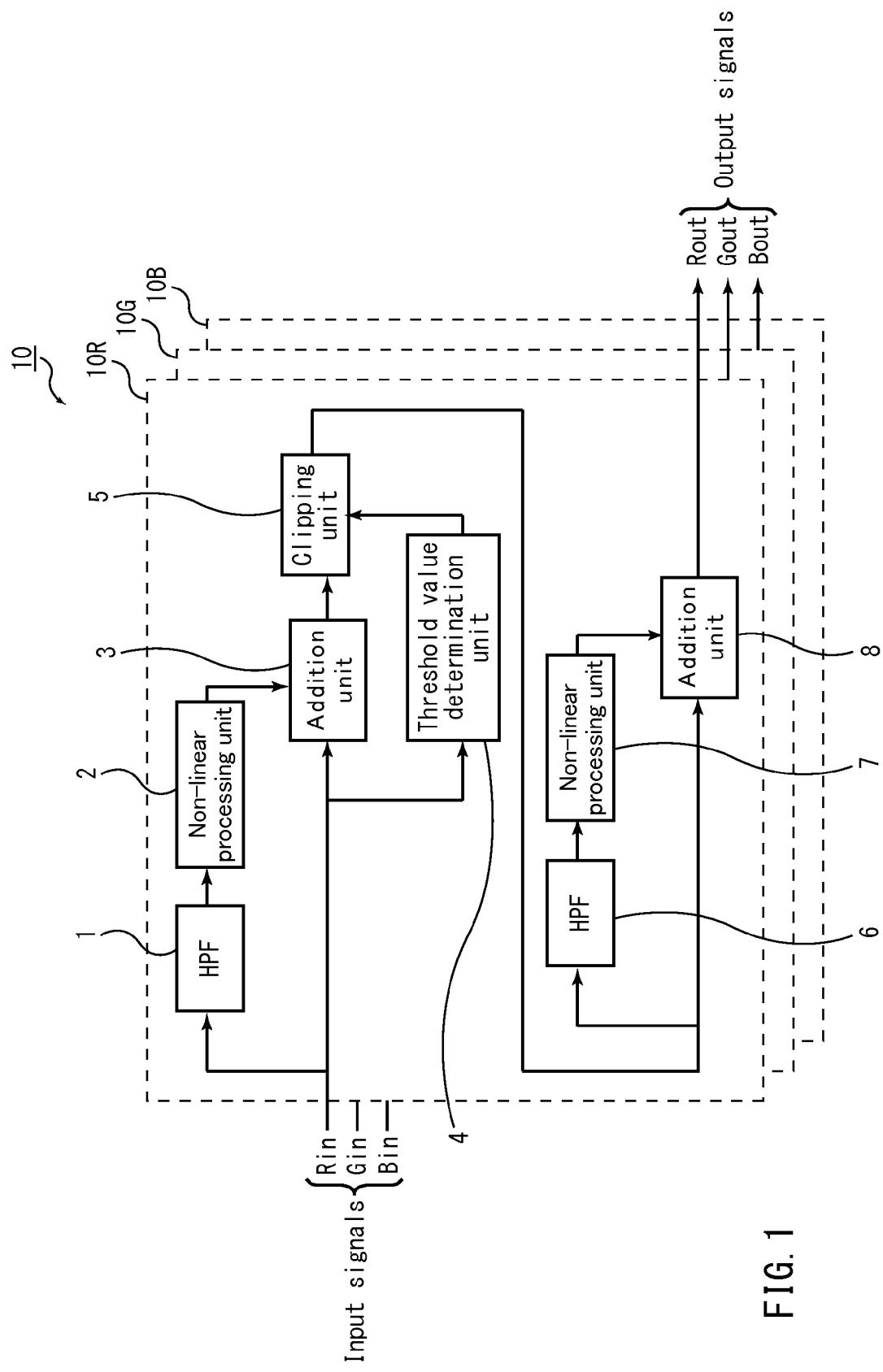
FIG. 1 is a block diagram showing a configuration of an image processing apparatus according to a first embodiment.

An image processing apparatus according to an embodiment of the present invention includes: a first high-pass filter that extracts a mid-high range component having frequencies greater than or equal to a first frequency value from an input image signal; a first non-linear processing unit that performs non-linear processing on an output signal from the first high-pass filter; a first addition unit that adds an output signal from the first non-linear processing unit and the input image signal; a threshold value determination unit that detects a maximum value and a minimum value of pixel values of the input image signal in a range thereof that was subjected to processing in the first high-pass filter processing, and determines an upper threshold value and a lower threshold value for clipping processing based on the maximum value and the minimum value; a clipping unit that performs clipping processing on an output signal from the first addition unit using the upper threshold value and the lower threshold value; a second high-pass filter that extracts a high range component having frequencies greater than or equal to a second frequency value that is greater than the first frequency value from an output signal from the clipping unit; a second non-linear processing unit that performs non-linear processing on an output signal from the second high-pass filter; and a second addition unit that adds an output signal from the second non-linear processing unit and the output signal from the clipping unit.

According to the above configuration, emphasis processing is performed a first time on the mid-high range component obtained by the first high-pass filter and the first non-linear processing unit, then clipping processing is performed, and thereafter emphasis processing is performed a second time on the high range component obtained by the second high-pass filter and the second nonlinear processing unit. This enables realizing an image processing apparatus that obtains an effect of improving perceived definition even in the case where the input image signal does not include much of a high range component.

Specifically, the first high-pass filter extracts the mid-high range component that includes a lower frequency domain than that of the high range component that is extracted by the second high-pass filter. Then the first non-linear processing unit performs non-linear processing on the mid-high range component, and then clipping processing is performed on the result of that processing. Note that clipping processing is processing in which the maximum value of the signal input to the clipping processing unit is limited to the same value as the upper threshold value received from the threshold value determination unit, and the minimum value of the input signal is limited to the same value as the lower threshold value. The signal obtained by this clipping processing has flat portions at levels defined by the upper threshold value and the lower threshold value.

Also, the signal that is generated in the clipping processing and is accompanied by steep and discontinuous change has a high range component that is not included in the input image signal, and therefore a high range component that did not exist in the input image signal is included in the signal extracted by the later-stage second high-pass filter. Then non-linear processing is performed on the output signal from the second high-pass filter, and the result is added to the output signal from the clipping unit, thus obtaining an image signal in having an emphasized high range component that was not included in the input image signal.

Accordingly, as described above, the image processing apparatus according to the present embodiment can obtain an effect of improving perceived definition even in the case where the input image signal does not include much of a high range component.

In the image processing apparatus according to the above configuration, if a tap number of the first high-pass filter is set higher than a tap number of the second high-pass filter, the first high-pass filter can extract the mid-high range component, and the second high-pass filter can extract the high range component.

In the image processing apparatus according to the above configuration, at least any one of gain processing, limiting processing, and coring processing can be applied as the non-linear processing.

Also, the above image processing apparatus may have a configuration in which the input image signal includes three primary color image signals, and the image processing apparatus includes a set of the first high-pass filter, the first non-linear processing unit, the first addition unit, the threshold value determination unit, the clipping unit, the second high-pass filter, the second non-linear processing unit, and the second addition unit for each of the three primary color image signals (first configuration).

Alternatively, the above image processing apparatus may have a configuration further including a color space conversion unit that converts the input image signal into a luminance signal and a chrominance signal and outputs the luminance signal to the first high-pass filter; a delay unit that receives the chrominance signal and delays the chrominance signal by a time period required for processing performed on the luminance signal by the first high-pass filter, the first non-linear processing unit, the first addition unit, the threshold value determination unit, the clipping unit, the second high-pass filter, the second non-linear processing unit, and the second addition unit; and a color space reversion unit that receives an output signal from the delay unit and an output signal from the second addition unit and converts the output signals back into the same format as that of the input image signal (second configuration). The second configuration has an advantage that the circuit scale can be smaller than that of the first configuration, and hue is not influenced.

Also, a display apparatus according to an embodiment of the present invention is configured including: the image processing apparatus according to any of the above-described configurations; and a display unit that performs display based on an output signal from the image processing apparatus. According to this display apparatus, even in the case where the image signal input to the image processing apparatus does not include much of a high-frequency component, a signal having an improved perceived definition is supplied by the image processing apparatus, thus enabling realizing high-quality display.

Also, the present invention can be carried out as the following computer program. This computer program causes a computer to execute the following: a first extraction step of extracting a mid-high range component having frequencies greater than or equal to a first frequency value from an input image signal; a first non-linear step on an output signal obtained in the first extraction step; a first addition step of adding an output signal obtained in the first nonlinear step and the input image signal; a threshold value determination step of detecting a maximum value and a minimum value of pixel values of the input image signal in a range that was subjected to processing in the first extraction step, and determining an upper threshold value and a lower threshold value for clipping processing based on the maximum value and the minimum value; a clipping step on an output signal obtained in the first addition step, using the upper threshold value and the lower threshold value; a second extraction step of extracting a high range component having frequencies greater than or equal to a second frequency value that is greater than the first frequency value from an output signal obtained in the clipping step; a second non-linear step on an output signal obtained in the second extraction step; and a second addition step of adding an output signal obtained in the second non-linear step and the output signal obtained in the clipping step.

Furthermore, a computer-readable recording medium having this computer program recorded thereon is included as an embodiment of the present invention.

Also, an image processing method of the present invention includes: a first extraction step of extracting a mid-high range component having frequencies greater than or equal to a first frequency value from an input image signal; a first non-linear step on an output signal obtained in the first extraction step; a first addition step of adding an output signal obtained in the first non-linear step and the input image signal; a threshold value determination step of detecting a maximum value and a minimum value of pixel values of the input image signal in a range that was subjected to processing in the first extraction step, and determining an upper threshold value and a lower threshold value for clipping processing based on the maximum value and the minimum value; a clipping step on an output signal obtained in the first addition step, using the upper threshold value and the lower threshold value; a second extraction step of extracting a high range component having frequencies greater than or equal to a second frequency value that is greater than the first frequency value from an output signal obtained in the clipping step; a second non-linear step on an output signal obtained in the second extraction step; and a second addition step of adding an output signal obtained in the second non-linear step and the output signal obtained in the clipping step.

Embodiments

The following is a detailed description of embodiments of the present invention with reference to the drawings. In the drawings, the same or corresponding portions are given the same reference signs, and redundant descriptions thereof will not be given.

First Embodiment

FIG. 1 is a block diagram showing the configuration of an image processing apparatus 10 according to a first embodiment. As shown in FIG. 1, the image processing apparatus 10 receives the signal values of R (red), G (green), and B (blue) color pixels, and outputs the signal values of the RGB color pixels. In order to perform enhancement processing on the input signals from these color pixels, the image processing apparatus 10 includes an R pixel processing circuit 10R, a G pixel processing circuit 10G, and a B pixel processing circuit 10B.

FIG. 1 shows only the internal configuration of the R pixel processing circuit 10R. Note that since the internal configurations of the G pixel processing circuit 10G and the B pixel processing circuit 10B are similar to that of the R pixel processing circuit 10R, depictions and descriptions thereof will not be given.

As shown in FIG. 1, the R pixel processing circuit 10R includes a high-pass filter (HPF) 1, a non-linear processing unit 2, an addition unit 3, a threshold value determination unit 4, a clipping unit 5, a high-pass filter 6, a non-linear processing unit 7, and an addition unit 8.

The high-pass filters 1 and 6 extract a high-frequency component from an input signal. It should be noted that the high-pass filter 1 extracts a high-frequency component that includes a lower frequency component than the high-pass filter 6 does. Specifically, whereas the high-pass filter 1 extracts a frequency component that is greater than or equal to a frequency f1, the high-pass filter 6 extracts a frequency component that is greater than or equal to a frequency f2 (note that f1<f2). The filter characteristics of the high-pass filters 1 and 6 can be adjusted using the tap number and the filter coefficient. Accordingly, by using a filter with a higher tap number than that of the high-pass filter 6 as the high-pass filter 1, for example, the frequency domain extracted by the high-pass filter 1 can be set to a lower range than the frequency domain extracted by the high-pass filter 6. In the following description, the frequency domain extracted by the high-pass filter 1 (i.e., the frequency domain including frequencies greater than or equal to f1) is referred to as the "mid-high range", and the frequency domain extracted by the high-pass filter 6 (i.e., the frequency domain including frequencies greater than or equal to f2) is referred to as the "high range". Note that the values of the frequencies f1 and f2 may be appropriately set according to the desired image quality and the like, as long as the relationship f1<f2 is satisfied.

The non-linear processing unit 2 carries out non-linear processing such as gain processing, limiting processing, and coring processing on the mid-high range component output from the high-pass filter 1. Specific examples of such processing will be described later.

The addition unit 3 adds the signal output from the non-linear processing unit 2 to the input signal.

The threshold value determination unit 4 detects the maximum value and the minimum value in the processing range of the input signal, and determines, based on the detection results, an upper threshold value and a lower threshold value that are referenced in clipping processing in the later-stage clipping unit 5. Details of the processing performed by the threshold value determination unit 4 will be described later.

The clipping unit 5 performs clipping processing on the output signal from the addition unit 3 depending on the upper threshold value and the lower threshold value that were set by the threshold value determination unit 4. Details of the clipping processing will be described later.

The high-pass filter 6 extracts the high range component from the output of the clipping unit 5. The non-linear processing unit 7 carries out non-linear processing on the high range component output from the high-pass filter 6, similarly to the non-linear processing unit 2. The addition unit 8 adds the signal output from the non-linear processing unit 7 to the output signal from the clipping unit 5.

Next, a description of operations performed by the R pixel processing circuit 10 having the above configuration will be described. Note that since the operations performed by the G pixel processing circuit 10G and the B pixel processing circuit 10B are similar to those of the R pixel processing circuit 10R, redundant descriptions thereof will not be given.

Figure 2A:
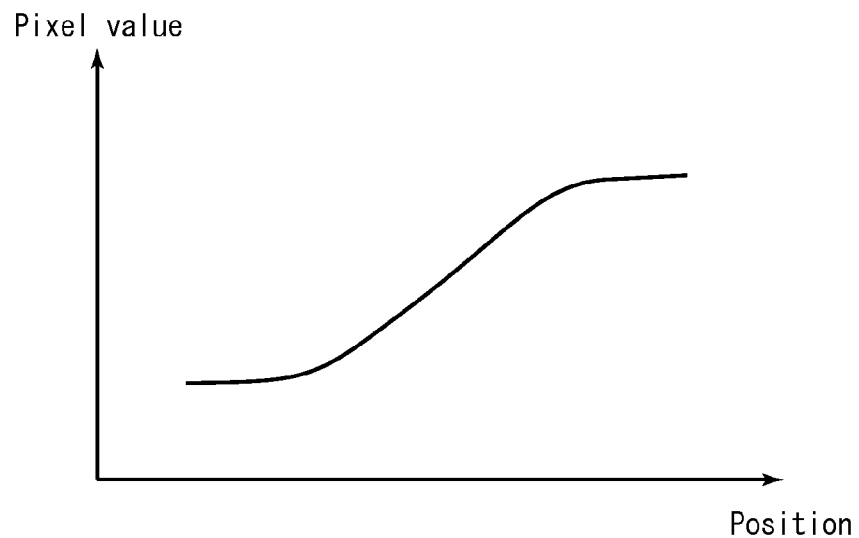
FIG. 2A is a signal characteristic diagram showing the relationship between pixel position and pixel value in one example of an input signal that is input to an R pixel processing circuit.
Figure 2B:
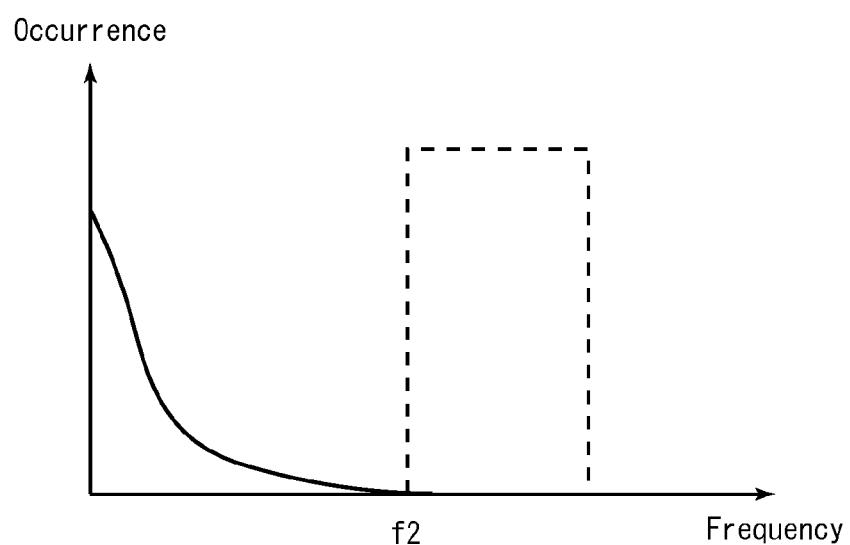
FIG. 2B is a signal characteristic diagram showing the relationship between frequency and occurrence for the input signal shown in FIG. 2A.

FIG. 2A shows the relationship between pixel position and pixel value (pixel grayscale level) in one example of an input signal Rin that is input to the R pixel processing circuit 10R. FIG. 2B shows the relationship between frequency and occurrence for the input signal Rin shown in FIG. 2A. Here, the input signal Rin given as an example in FIGS. 2A and 2B is a relatively low-resolution signal that does not include a high-frequency component.

First, the high-pass filter 1 extracts the mid-high range component from the input signal Rin that was input to the R pixel processing circuit 10R. Next, the non-linear processing unit 2 carries out non-linear processing on the mid-high range component that was extracted by the high-pass filter 1.

Figure 3:
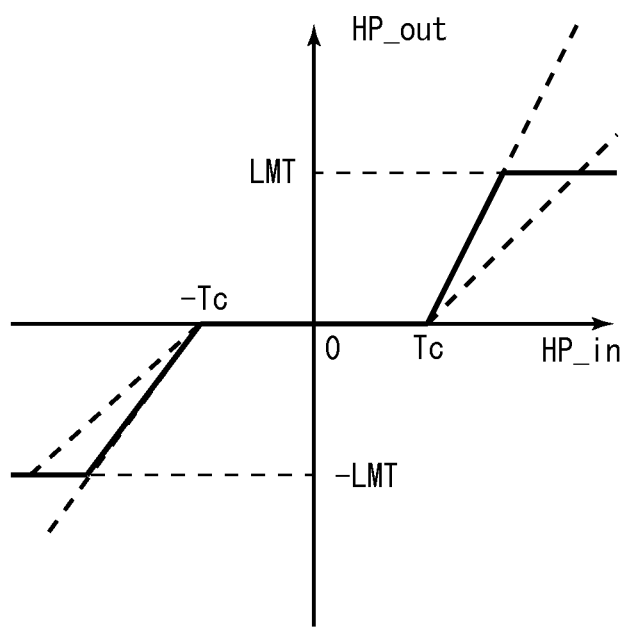
FIG. 3 is a characteristics diagram showing the relationship between an input signal (HP_in) that is input to a first non-linear processing unit and an output signal (HP_out).

The following describes a specific example of the processing performed by the non-linear processing unit 2 with reference to FIG. 3. As mentioned above, the non-linear processing unit 2 performs non-linear processing such as gain processing, limiting processing, and coring processing. FIG. 3 is a characteristics diagram showing the relationship between an input signal (HP_in) that is input to the non-linear processing unit 2 and an output signal (HP_out) in the case where the non-linear processing unit 2 performs non-linear processing that is a combination of gain processing, limiting processing, and coring processing.

Coring processing is processing for blocking or attenuating output with respect to a frequency component including amplitudes whose magnitudes are less than or equal to a predetermined threshold value. For example, in the example shown in FIG. 3, according to the coring processing, the component of the input signal HP_in in which the absolute values of the amplitudes are less than or equal to a predetermined coring threshold value Tc is blocked, and the output signal HP_out for that component is zero. Note that although the output for the component including amplitudes whose magnitudes are less than or equal to the predetermined threshold value is completely set to zero in the example shown in FIG. 3, that component may be attenuated by a predetermined ratio.

Gain processing is processing for amplifying an input signal by multiplying the input signal by a predetermined gain value. For example, in the example shown in FIG. 3, the component in which the absolute values of the amplitudes exceed the coring threshold value Tc is amplified in the gain processing. Note that in the example shown in FIG. 3, according to limiting processing, the amplitude of the component of the output signal HP_out in which the amplitudes exceed a threshold value LMT is limited to the threshold value LMT.

By appropriately combining gain processing, limiting processing, and coring processing, for example, as described above, the non-linear processing unit 2 can boost the mid-high range component that was extracted by the high-pass filter 1. Note that the example shown in FIG. 3 is merely one example of the non-linear processing performed by the non-linear processing unit 2. It should also be noted that the non-linear processing unit 2 may be provided with lookup tables in which input signal values and output signal values are associated with each other, in order to realize the non-linear processes.

Figure 4A:
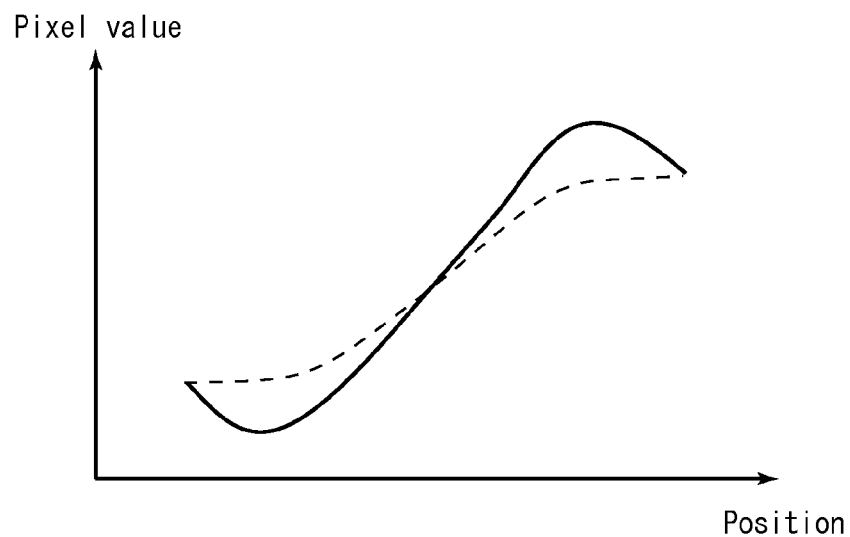
FIG. 4A is a signal characteristic diagram showing the relationship between pixel position and pixel value in one example of a signal that is output from a first addition unit.
Figure 4B:
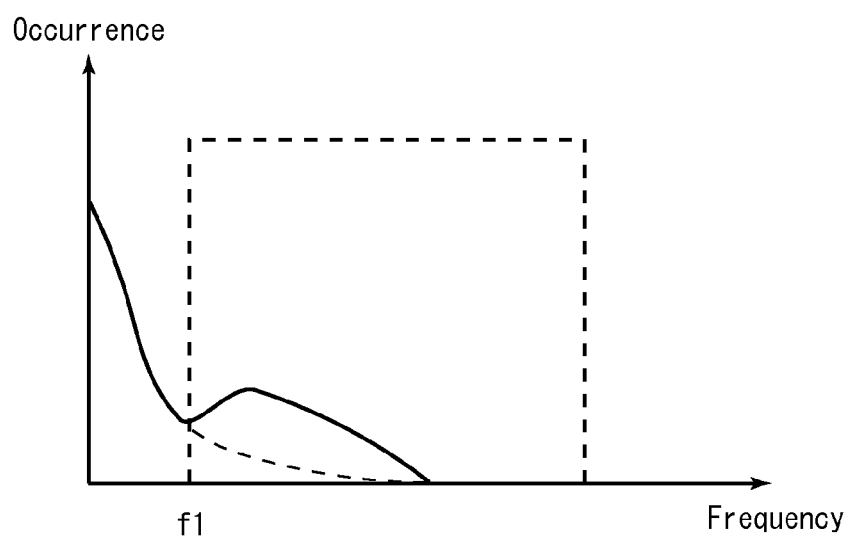
FIG. 4B is a signal characteristic diagram showing the relationship between frequency and occurrence for the input signal shown in FIG. 4A.

The addition unit 3 adds the output signal from the non-linear processing unit 2 to the input signal Rin. FIGS. 4A and 4B show the signal output from the addition unit 3 after undergoing the above-described processing. As shown in FIG. 4B, the mid-high range component that was extracted by the high-pass filter 1 is boosted by the non-linear processing unit 2. Also, as shown in FIG. 4A, the edges of the signal have become steeper as a result of the non-linear processing performed by the non-linear processing unit 2.

Note that the input signal Rin is input to the threshold value determination unit 4 as well. The threshold value determination unit 4 obtains the maximum value and minimum value of the amplitudes in the range of the input signal Rin that was determined to be the processing target of the high-pass filter 1 (referred to as the "processing target range"). Based on the obtained maximum value and minimum value, the threshold value determination unit 4 determines an upper threshold value and a lower threshold value for later-stage clipping processing. Here, the above-described maximum value and minimum value may respectively be set as-is as the upper threshold value and lower threshold value, or the upper threshold value and the lower threshold value may be determined by subjecting the maximum value and the minimum value to arbitrary adjustment.

The clipping unit 5 carries out clipping processing on the signal output from the addition unit 3, based on the upper threshold value and the lower threshold value that were determined by the threshold value determination unit 4. The clipping processing performed by the clipping unit 5 is processing in which, with respect to the signal including the mid-high range component that was boosted by the non-linear processing unit 2, the component of the signal that exceeds the upper threshold value is limited to the same value as the upper threshold value, and the component of the signal that is below the lower threshold value is limited to the same value as the lower threshold value.

Figure 5:
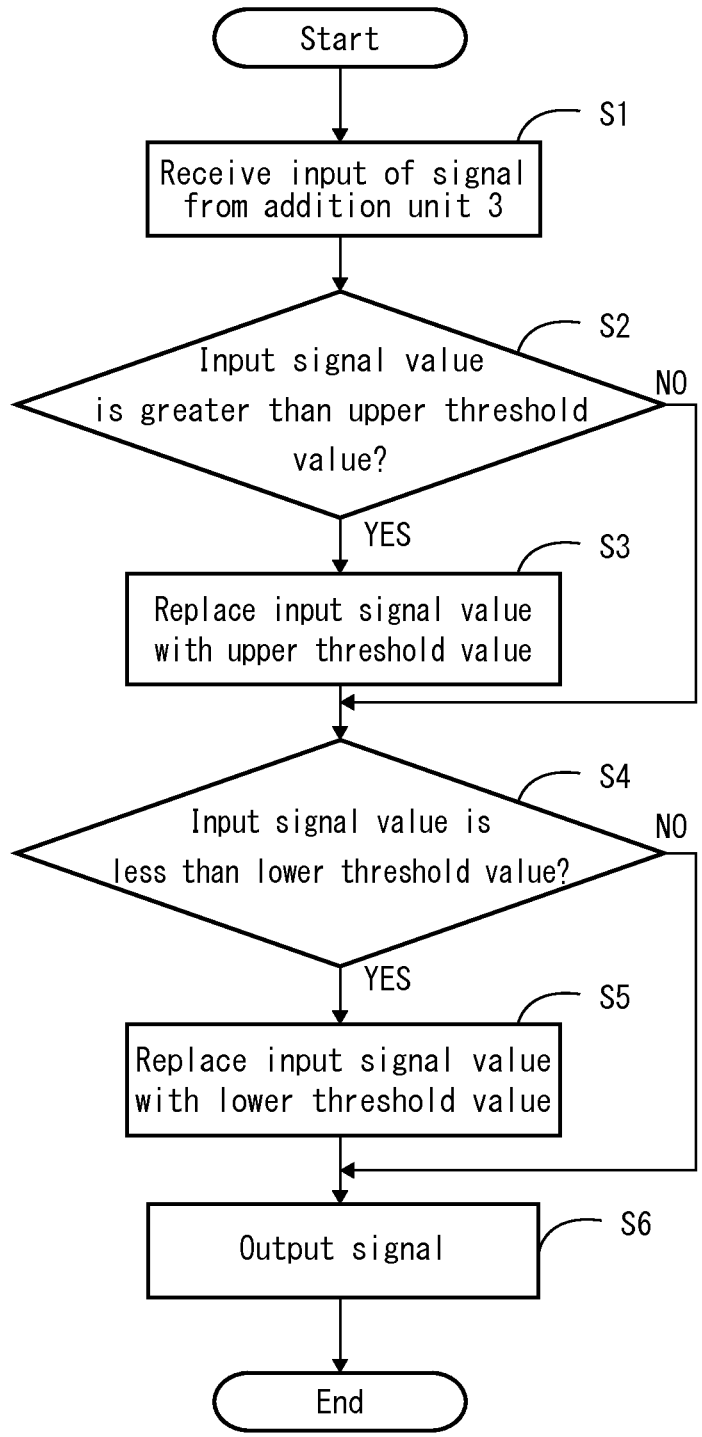
FIG. 5 is a flowchart showing a flow of clipping processing performed by a clipping unit.

FIG. 5 is a flowchart showing the flow of the clipping processing performed by the clipping unit 5. The clipping unit 5 receives the signal that is output from the addition unit 3 (step S1), and determines whether the input signal value is greater than the upper threshold value that was obtained by the threshold value determination unit 4 (step S2). In the case where the determination result in step S2 is affirmative (YES in step S2), the clipping unit 5 replaces the input signal value with the upper threshold value (step S3). In the case where the determination result in step S2 is negative (NO in step S2), the procedure bypasses step S3 and proceeds to step S4. The clipping unit 5 then determines whether the input signal value is below the lower threshold value that was obtained by the threshold value determination unit 4 (step S4). In the case where the determination result in step S4 is affirmative (YES in step S4), the clipping unit 5 replaces the input signal value with the lower threshold value (step S5). In the case where the determination result in step S4 is negative (NO in step S4), the procedure bypasses step S5 and proceeds to step S6. In step S6, the clipping unit 5 outputs the signal resulting from the processing.

Figure 6A:
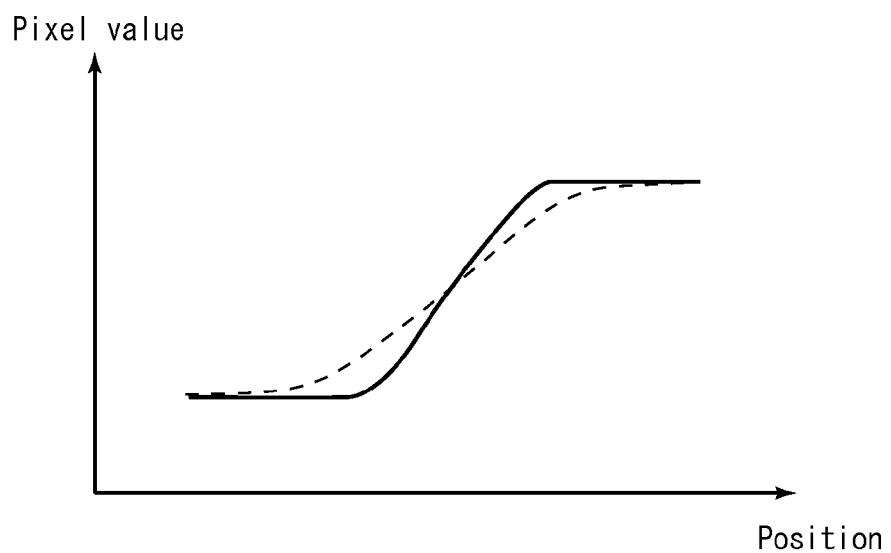
FIG. 6A is a signal characteristic diagram showing the relationship between pixel position and pixel value in one example of a signal that is output from the clipping unit.
Figure 6B:
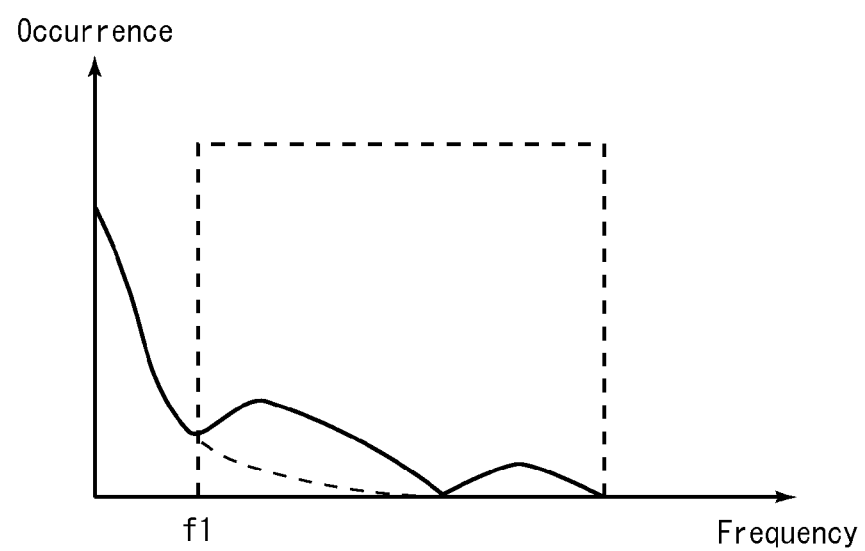
FIG. 6B is a signal characteristic diagram showing the relationship between frequency and occurrence for the input signal shown in FIG. 6A.

FIGS. 6A and 6B show the output signal from the clipping unit 5. As shown in FIG. 6A, the output signal from the clipping unit 5 is limited such that the maximum value and minimum value of the pixel values are respectively the upper threshold value and the lower threshold value, thus forming flat portions in the vicinity of the steep edges of the signal. The signal that is generated through this processing and is accompanied by steep and discontinuous change has a high range component that is not included in the input image signal. Accordingly, as shown in FIG. 6B, a high-frequency component that did not exist in the signals shown in FIGS. 2B and 4B appears as an effect of the clipping processing.

Figure 7:
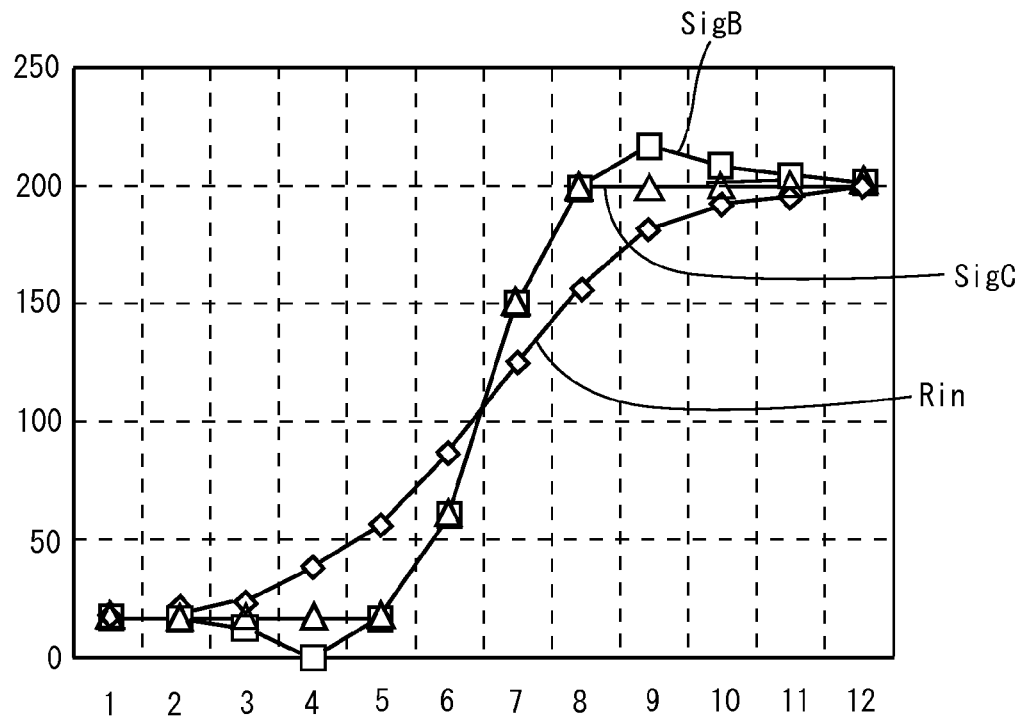
FIG. 7 is a signal characteristic diagram showing one example of the relationship between an input signal, an output signal (boosted signal) from the first addition unit, and a signal resulting from clipping processing.

FIG. 7 shows a more specific example of the relationship between the input signal Rin, an output signal (boosted signal) SigB from the addition unit 3, and a signal SigC resulting from the clipping processing. The horizontal axis in FIG. 7 represents pixel positions, and the vertical axis represents pixel values (pixel grayscale levels). As shown in FIG. 7, the boosted signal SigB that was subjected to edge emphasis in boost processing is obtained from the input signal Rin. Furthermore, the signal SigC resulting from the clipping processing that has a flat portion in which the maximum value is at the level of approximately 200 and a flat portion in which the minimum value is at the level of approximately 20 due to the clipping processing, is obtained from the boosted signal SigB.

The output from the clipping unit 5 is input to the high-pass filter 6. The high-pass filter 6 extracts the high range component from the signal received from the clipping unit 5. As described above, whereas the high-pass filter 1 extracts the mid-high range that is greater than or equal to the frequency f1, the high-pass filter 6 extracts the high range component that is greater than or equal to the frequency f2 (note that f1<f2).

The high range component extracted by the high-pass filter 6 is sent to the non-linear processing unit 7. The nonlinear processing unit 7 boosts the high range component by carrying out nonlinear processing such as gain processing, limiting processing, and coring processing. Note that the content of the nonlinear processing performed by the nonlinear processing unit 7 may be entirely the same as the processing content performed by the nonlinear processing unit 2, or alternatively, processing parameters, the types of processing, and the like may be different from the processing performed by the non-linear processing unit 2.

After being subjected to the processing performed by the non-linear processing unit 7, the high range component is sent to the addition unit 8, in which it is added to the output signal from the clipping unit 5 by the addition unit 8. The output from the addition unit 8 is an output signal Rout of the R pixel processing circuit 10R.

Figure 8A:
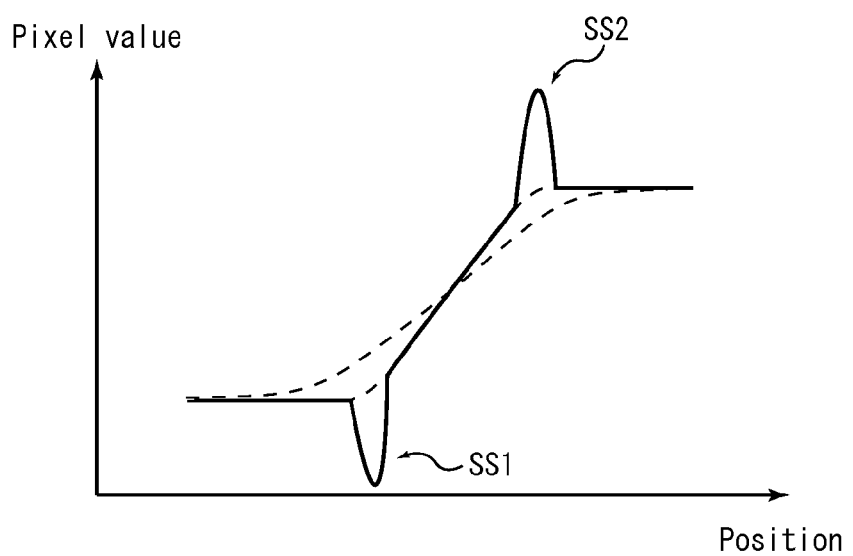
FIG. 8A is a signal characteristic diagram showing the relationship between pixel position and pixel value in one example of a signal that is output from the R pixel processing circuit.
Figure 8B:
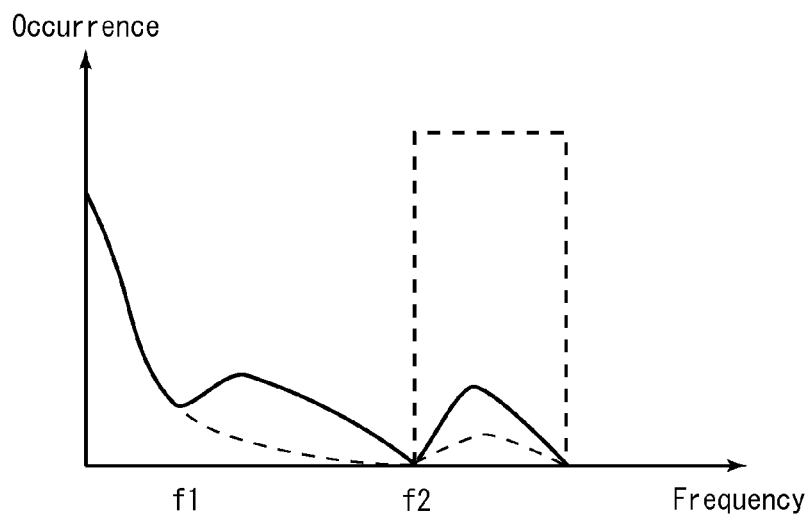
FIG. 8B is a signal characteristic diagram showing the relationship between frequency and occurrence for the input signal shown in FIG. 8A.

FIGS. 8A and 8B show the output signal Rout of the R pixel processing circuit 10R. As shown in FIG. 8B, the high-frequency component that is greater than or equal to the frequency f2 is emphasized in the output signal Rout. Also, as shown in FIG. 8A, an undershoot signal SS1 and an overshoot signal SS2 are formed in the vicinity of the flat portions in the output signal Rout. These undershoot and overshoot signals SS1 and SS2 include up to pixel-level detail, and therefore can improve the perceived definition of the input signal to the pixel level.

Figure 9:
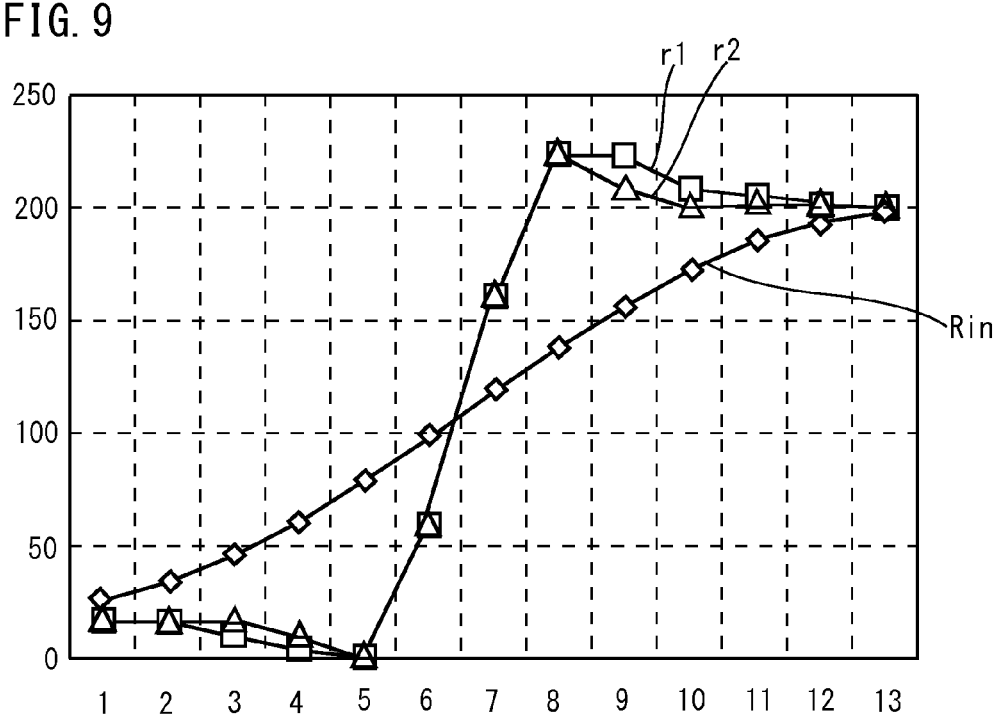
FIG. 9 is a signal characteristic diagram showing one example of the result of processing performed by the R pixel processing circuit.

FIG. 9 shows an example of processing results of the R pixel processing circuit 10R. The horizontal axis in FIG. 9 represents pixel positions, and the vertical axis represents pixel values. A curve r1 shown in FIG. 9 represents the signal characteristics obtained in the case of using a 9-tap filter as the high-pass filter 1 and using a 7-tap filter as the high-pass filter 6. A curve r2 shown in FIG. 9 represents the signal characteristics obtained in the case of using a 9-tap filter as the high-pass filter 1 and using a 3-tap filter as the high-pass filter 6.

As shown in FIG. 9, whereas the slope of the input signal Rin is very gentle (i.e., there is little of the high-frequency component), steep edges are formed in both the curves r1 and r2. Also, the signal that is generated has a narrower overshooting range and higher frequency in the case of using the 3-tap filter (curve r2) as the later-stage high-pass filter 6 than in the case of using the 7-tap filter (curve r1). In other words, it is understood that the signal characteristics expressed by the curve r2 have a higher perceived definition. Note that "overshooting" refers to a signal that has high-magnitude values that can be changed to a flat portion, which in the example of FIG. 9 are the signals that have pixel values greater than or equal to 200.

Figure 10:
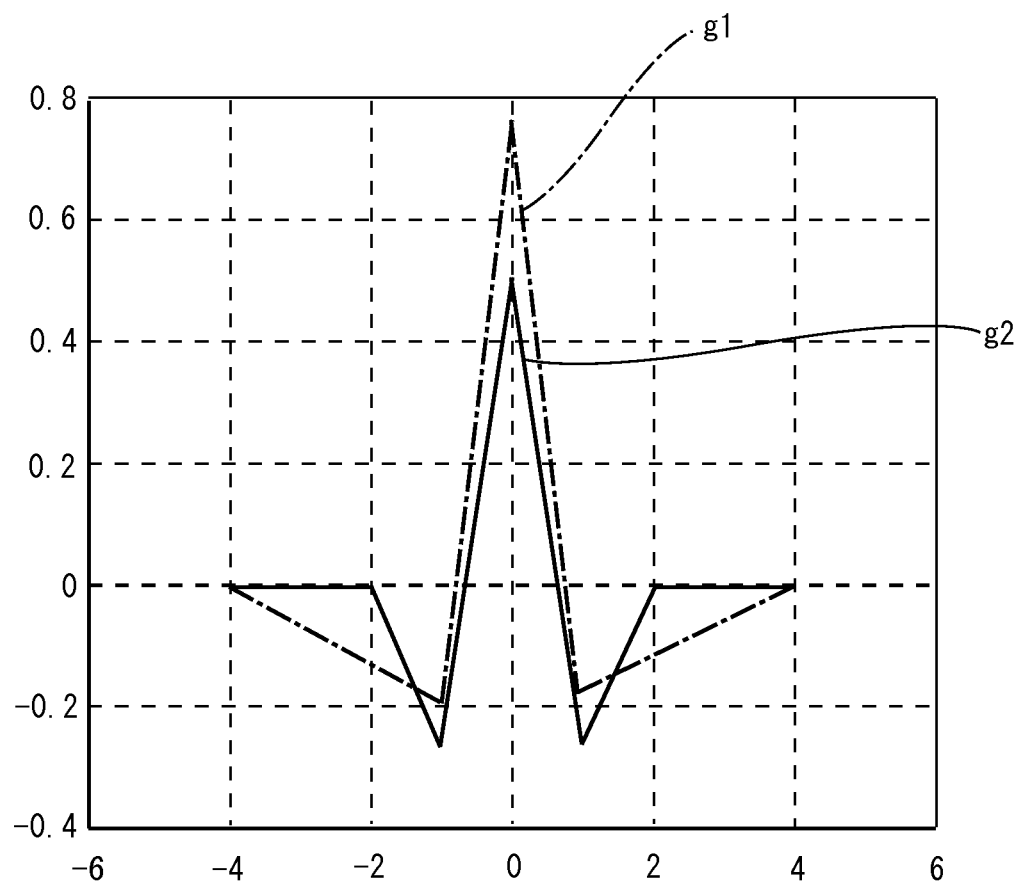
FIG. 10 is a diagram showing characteristics of a 7-tap high-pass filter and a 3-tap high-pass filter.
Figure 11:
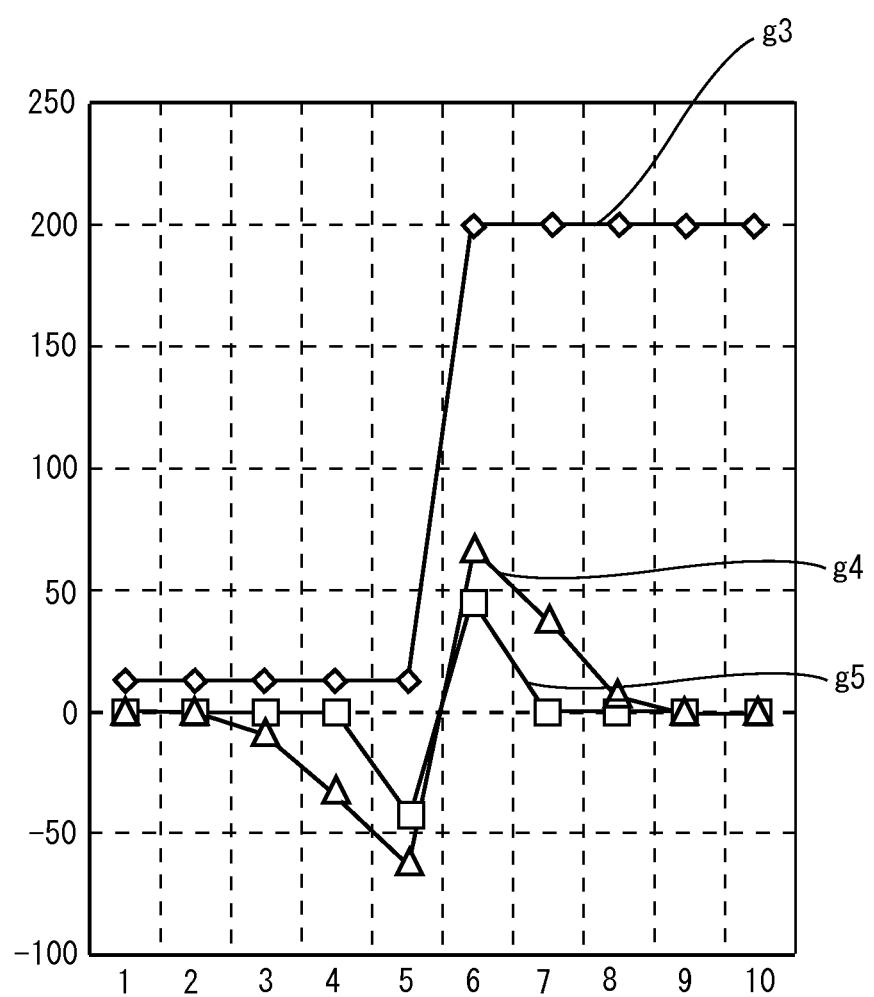
FIG. 11 is a diagram showing characteristics of a 7-tap high-pass filter and a 3-tap high-pass filter.

Note that FIGS. 10 and 11 show characteristics of a 7-tap high-pass filter and a 3-tap high-pass filter. In FIG. 10, a line g1 represents the filter coefficient of the 7-tap filter, and a line g2 represents the filter coefficient of the 3-tap filter. In FIG. 11, a line g3 represents the characteristics of an input signal, a line g4 represents the output of the 7-tap filter with respect to the input signal, and a line g5 represents the output of the 3-tap filter with respect to the input signal.

As is understood from FIG. 11, compared to the output of the 3-tap filter (see g5), the output obtained from the 7-tap filter (see g4) is steeper at the edge portions, and has a wider range of signal value change in the flat portions. Accordingly, as described above, an output signal having higher perceived definition can be obtained when using filter that has a lower tap number as the later-stage high-pass filter 6.

As described above, since the image processing apparatus 10 of the first embodiment includes the R pixel processing circuit 10R, the G pixel processing circuit 10G, and the B pixel processing circuit 10B, an effect of improving perceived definition can be obtained even in the case where the input image signals Rin, Gin, and Bin do not include much of a high range component.

Second Embodiment

The following describes a second embodiment of the present invention.

Figure 12:
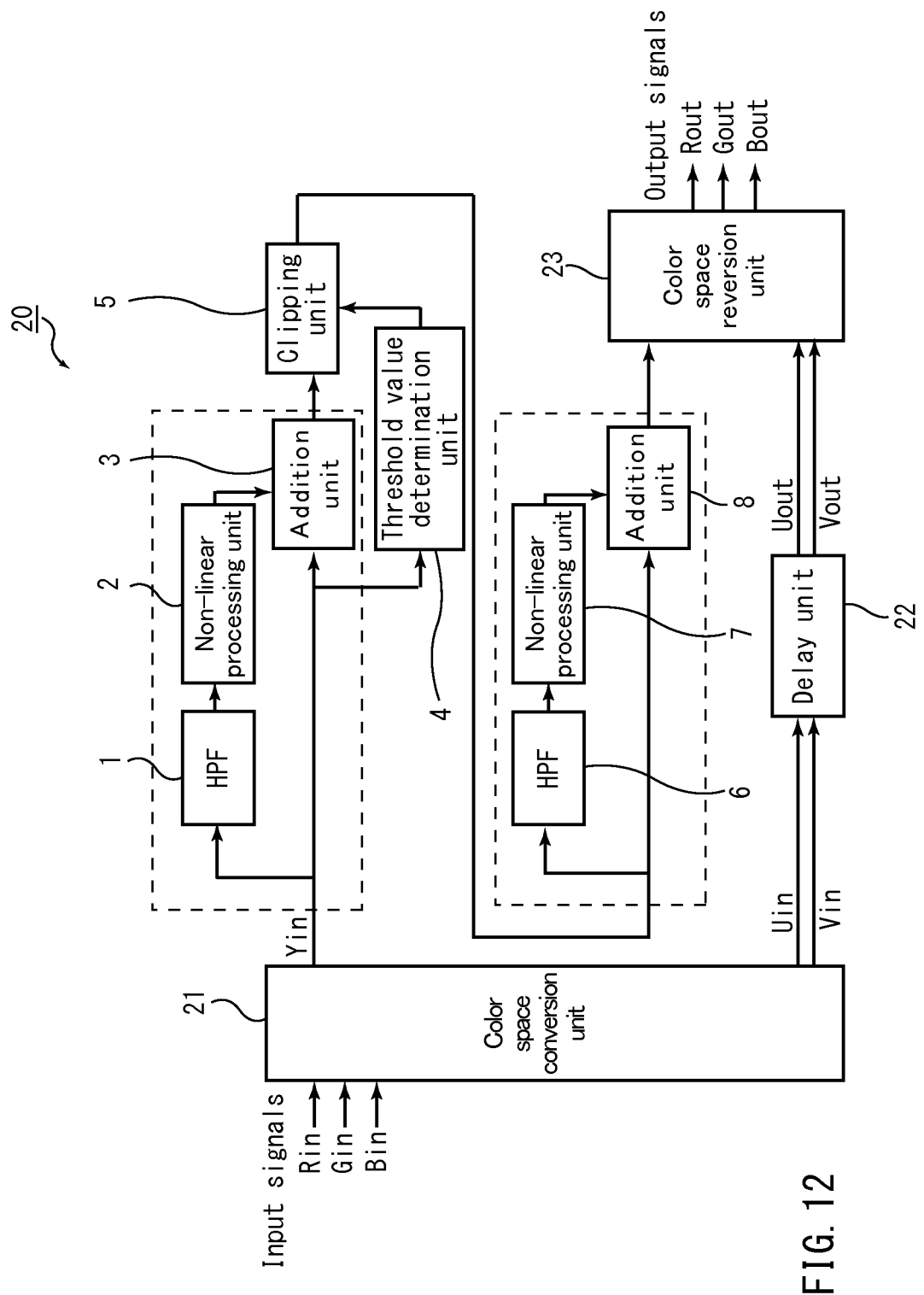
FIG. 12 is a block diagram showing a configuration of an image processing apparatus according to a second embodiment.

FIG. 12 is a block diagram showing the configuration of an image processing apparatus according to the second embodiment. The image processing apparatus 10 of the first embodiment includes the R pixel processing circuit 10R, the G pixel processing circuit 10G, and the B pixel processing circuit 10B that respectively correspond to the colors RGB.

In contrast, an image processing apparatus 20 of the present embodiment includes a color space conversion unit 21 that converts the three primary color input signals Rin, Gin, and Bin into a luminance signal Yin and chrominance signals Uin and Vin, as shown in FIG. 12. Also, the image processing apparatus 20 includes one set of the blocks of the first embodiment shown in FIG. 1 in order to perform enhancement processing on the luminance signal Yin.

The image processing apparatus 20 furthermore includes a delay unit 22 and a color space reversion unit 23. The delay unit 22 delays the chrominance signals Uin and Vin by the time period required to perform enhancement processing on the luminance signal Yin. The color space reversion unit 23 converts the luminance signal Yin resulting from the enhancement processing and the delayed chrominance signals Uin and Vin back to the same format as the input signals.

Note that the content of the enhancement processing performed by the high-pass filter 1, the non-linear processing unit 2, the addition unit 3, the threshold value determination unit 4, the clipping unit 5, the high-pass filter 6, the non-linear processing unit 7, and the addition unit 8 shown in FIG. 12 is the same as that in the first embodiment, and therefore a redundant description of such content will not be given.

The image processing apparatus 20 of the present embodiment includes circuitry for separating an input signal into the luminance signal Yin and the chrominance signals Uin and Vin and for performing enhancement processing on only the luminance signal Yin. Accordingly, the image processing apparatus 20 has an advantage in that the circuit scale thereof is shrunk to approximately ⅓ compared to that of the image processing apparatus 10 of the first embodiment that includes circuitry for performing enhancement processing on each of the three RGB color input signals.

Also, when enhancement processing is performed on the RGB color input signals independently as with the first embodiment, it is possible for the ratio of the RGB color components to change and for the hue of the output signal to change. However, performing enhancement processing on only the luminance signal Yin as with the second embodiment has an advantage that the above change in hue can be suppressed.

Figure 13A:
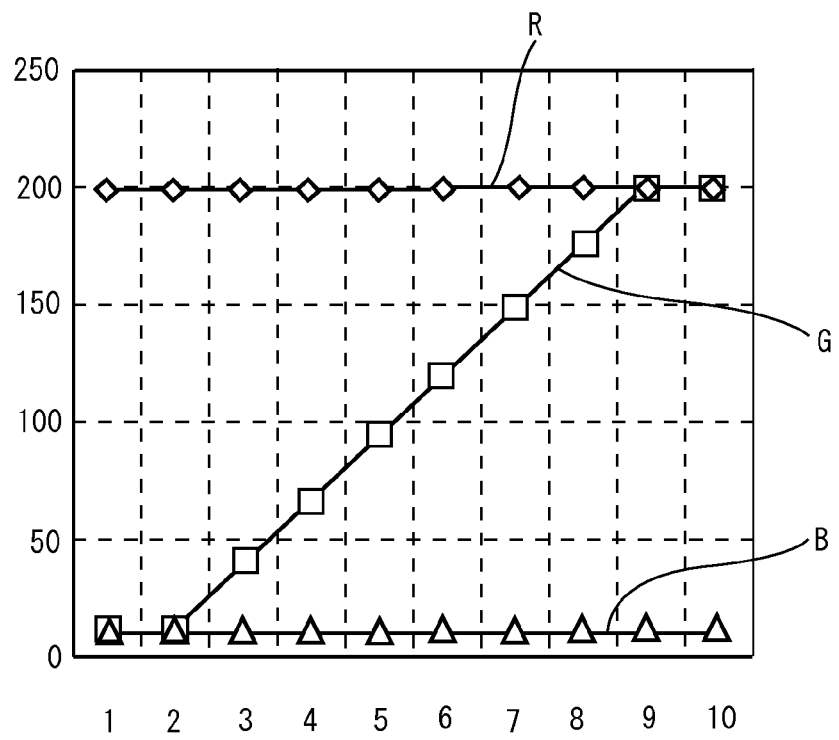
FIG. 13A is a diagram showing one example of RGB input signals.
Figure 13B:
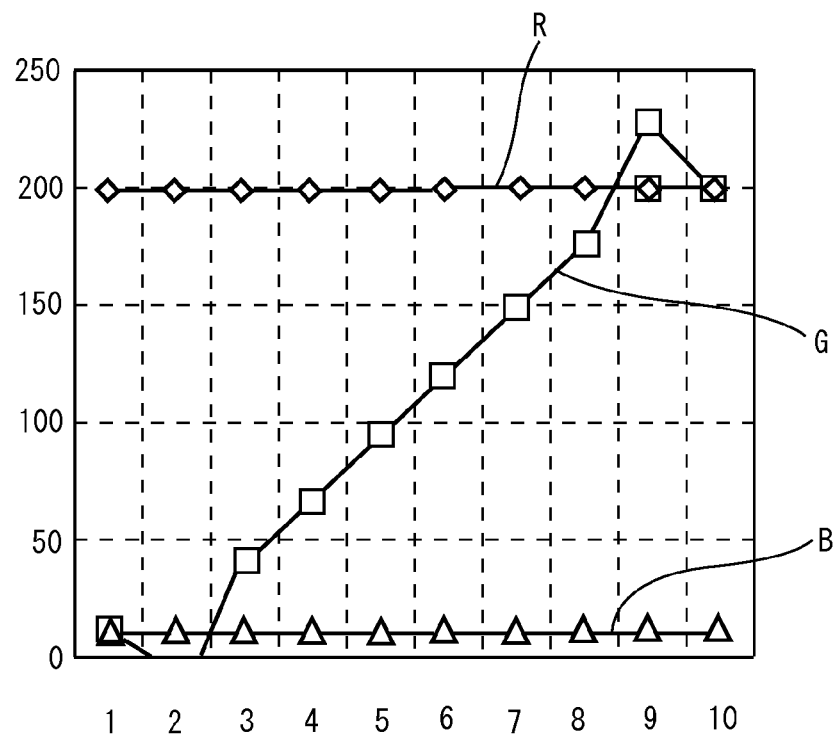
FIG. 13B is a diagram showing one example of signals obtained when enhancement processing according to the first embodiment is performed on the RGB input signals shown in FIG. 13A.
Figure 13C:
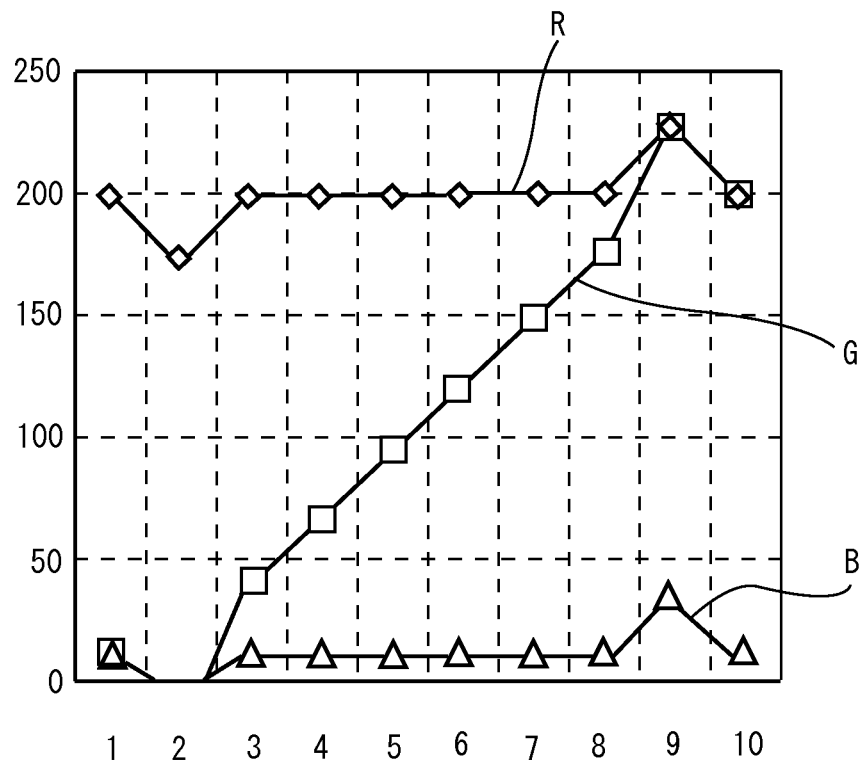
FIG. 13C is a diagram showing one example of signals obtained when enhancement processing according to the second embodiment is performed on the RGB input signals shown in FIG. 13A.

For example, in the case where RGB signals such as those shown in FIG. 13A have been input, output signals such as those shown in FIG. 13B are obtained if enhancement processing is performed on the RGB color input signals independently as with the first embodiment. Specifically, out of the RGB signals, only the G signal that has change in pixel values is enhanced, and the pixel values of the G signal are higher than the pixel values of the R signal in the overshooting portion, thus changing the hue. In contrast, output signals such as those shown in FIG. 13C are obtained with the second embodiment. Specifically, since the chrominance signals Uin and Vin that control the hue are prevented from being changed in enhancement processing in the second embodiment, the RGB ratio is maintained in the overshooting and undershooting portions, and the hue is not changed.

Third Embodiment

Figure 14:
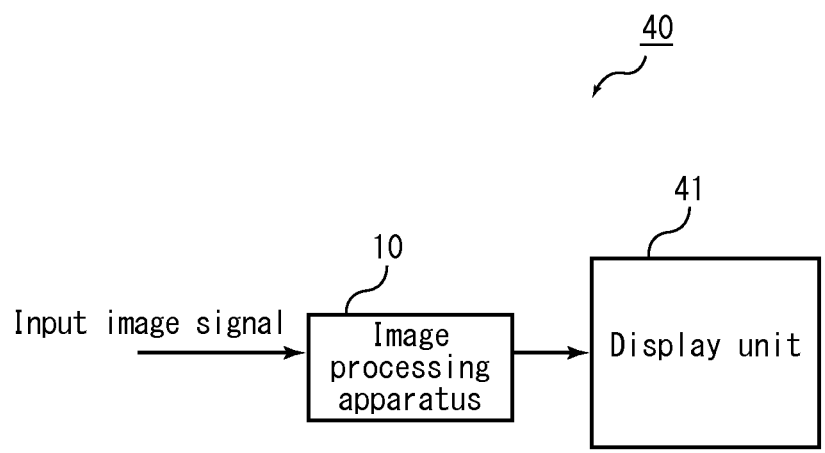
FIG. 14 is a block diagram showing a schematic configuration of a display apparatus according to an embodiment of the present invention.
Figure 15A:
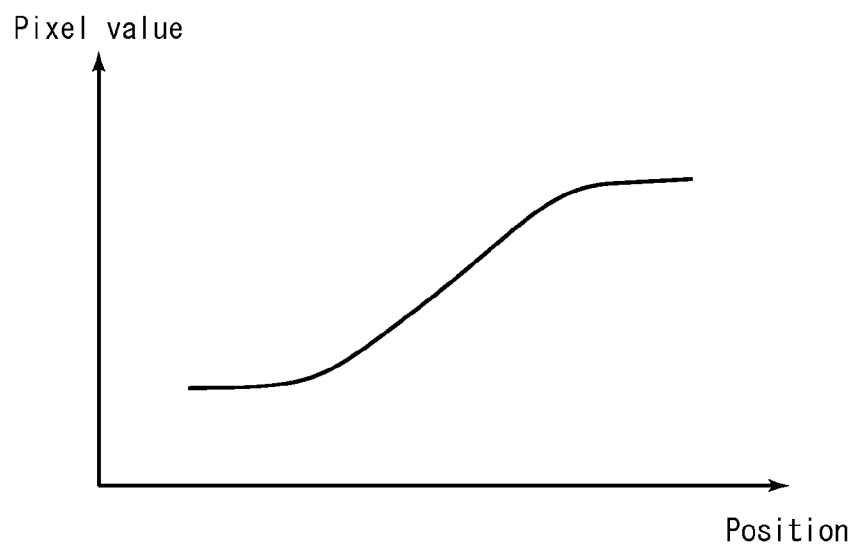
FIG. 15A is a signal characteristic diagram showing one example of an input image signal that is input to a conventional image processing apparatus.
Figure 15B:
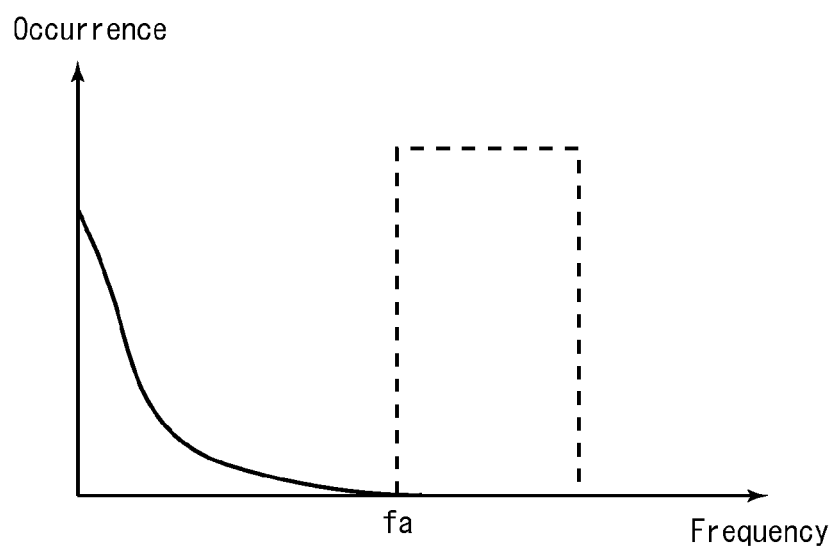
FIG. 15B is a signal characteristic diagram showing one example of the input image signal that is input to the conventional image processing apparatus.
Figure 15C:
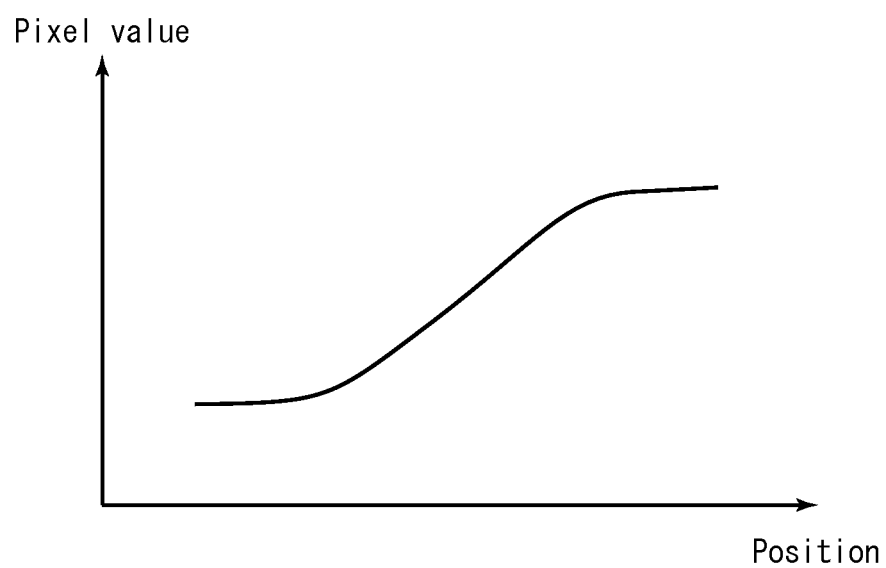
FIG. 15C is a signal characteristic diagram showing one example of an output signal with respect to the input signal shown in FIGS. 15A and 15B in the conventional image processing apparatus.

FIG. 14 is a block diagram showing the schematic configuration of a display apparatus according to an embodiment of the present invention. As shown in FIG. 14, a display apparatus 40 of the present embodiment includes a display unit 41 that displays an image based on an input image signal. The display unit 41 is not limited to any particular display. For example, an arbitrary display such as a liquid crystal display or a plasma display can be used as the display unit 41.

Also, the display apparatus 40 includes the image processing apparatus 10 of the first embodiment upstream of the input terminal of the display unit 41. Accordingly, even in the case where the input image signals Rin, Gin, and Bin do not include much of the high range component, signals Rout, Gout, and Bout having improved perceived definition are supplied from the image processing apparatus 10 to the display unit 41, and therefore the display unit 41 can realize high-quality display.

Note that the image processing apparatus 10 can be realized in the display apparatus 40 as, for example, a circuit chip mounted on a circuit substrate. Alternatively, the image processing apparatus 10 can be realized by a memory element storing a computer program that realizes the functionality of the image processing apparatus 10, as well as a general-purpose processor that reads out the program from the memory element and executes it.

Note that FIG. 14 shows the example of a display apparatus that includes the image processing apparatus 10 of the first embodiment. However, a configuration is possible in which the display apparatus includes the image processing apparatus 20 of the second embodiment instead of the image processing apparatus 10. This obtains the effect of being able to realize even higher-quality display since change in the hue is suppressed.

Although embodiments of the present invention have been described above, the above embodiments are merely illustrative examples for carrying out the present invention. Accordingly, the present invention is not intended to be limited to the above embodiments, and appropriate modifications can be made to the various types of embodiments described above without departing from the gist of the present invention.

Industrial Applicability

The present invention is industrially applicable as an image processing apparatus that performs enhancement processing on an input image signal, and a display apparatus including the image processing apparatus.

The invention claimed is:

1. An image processing apparatus comprising:
    a first high-pass filter that extracts a mid-high range component having frequencies greater than or equal to a first frequency value from an input image signal;
    a first non-linear processing unit that performs non-linear processing on an output signal from the first high-pass filter;
    a first addition unit that adds an output signal from the first non-linear processing unit and the input image signal;
    a threshold value determination unit that detects a maximum value and a minimum value of pixel values of the input image signal in a range thereof that was subjected to processing by the first high-pass filter, and determines an upper threshold value and a lower threshold value for clipping processing based on the maximum value and the minimum value;
    a clipping unit that performs clipping processing on an output signal from the first addition unit using the upper threshold value and the lower threshold value;
    a second high-pass filter that extracts a high range component having frequencies greater than or equal to a second frequency value that is greater than the first frequency value from an output signal from the clipping unit;
    a second non-linear processing unit that performs non-linear processing on an output signal from the second high-pass filter; and
    a second addition unit that adds an output signal from the second non-linear processing unit and the output signal from the clipping unit.

2. The image processing apparatus according to claim 1, wherein a tap number of the first high-pass filter is greater than a tap number of the second high-pass filter.

3. The image processing apparatus according to claim 1, wherein the non-linear processing includes at least any one of gain processing, limiting processing, and coring processing.

4. The image processing apparatus according to claim 1, wherein the input image signal includes three primary color image signals, and
the image processing apparatus comprises a set of the first high-pass filter, the first non-linear processing unit, the first addition unit, the threshold value determination unit, the clipping unit, the second high-pass filter, the second non-linear processing unit, and the second addition unit for each of the three primary color image signals.

5. The image processing apparatus according to claim 1, further comprising:
   a color space conversion unit that converts the input image signal into a luminance signal and a chrominance signal and outputs the luminance signal to the first high-pass filter;
   a delay unit that receives the chrominance signal and delays the chrominance signal by a time period required for processing performed on the luminance signal by the first high-pass filter, the first non-linear processing unit, the first addition unit, the threshold value determination unit, the clipping unit, the second high-pass filter, the second non-linear processing unit, and the second addition unit; and
   a color space reversion unit that receives an output signal from the delay unit and an output signal from the second addition unit and converts the output signals back into the same format as that of the input image signal.

6. A display apparatus comprising:
the image processing apparatus according to claim 1; and
a display unit that performs display based on an output signal from the image processing apparatus.

7. An image processing method comprising:
   a first extraction step of extracting a mid-high range component having frequencies greater than or equal to a first frequency value from an input image signal;
   a first non-linear step on an output signal obtained in the first extraction step;
   a first addition step of adding an output signal obtained in the first non-linear step and the input image signal;
   a threshold value determination step of detecting a maximum value and a minimum value of pixel values of the input image signal in a range that was subjected to processing in the first extraction step, and determining an upper threshold value and a lower threshold value for clipping processing based on the maximum value and the minimum value;
   a clipping step on an output signal obtained in the first addition step, using the upper threshold value and the lower threshold value;
   a second extraction step of extracting a high range component having frequencies greater than or equal to a second frequency value that is greater than the first frequency value from an output signal obtained in the clipping step;
   a second non-linear step on an output signal obtained in the second extraction step; and
   a second addition step of adding an output signal obtained in the second non-linear step and the output signal obtained in the clipping step.

* * * * *